(12) United States Patent
Zhu et al.

(10) Patent No.: US 8,175,203 B2
(45) Date of Patent: May 8, 2012

(54) BROADCAST CHANNEL ESTIMATOR

(75) Inventors: Jie Zhu, Sunnyvale, CA (US); Ahmed Said, Saratoga, CA (US); Roger Wu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 11/763,651

(22) Filed: Jun. 15, 2007

(65) Prior Publication Data

US 2008/0310563 A1 Dec. 18, 2008

(51) Int. Cl.
*H04B 1/10* (2006.01)
(52) U.S. Cl. ......... 375/350; 375/229; 375/233; 375/234
(58) Field of Classification Search ............ 375/346, 375/350, 229, 233, 234; 455/307; 708/300, 708/323
See application file for complete search history.

(56) References Cited

U.S. PATENT DOCUMENTS

| | | | |
|---|---|---|---|
| 6,693,958 B1 * | 2/2004 | Wang et al. .................. 375/232 |
| 7,203,232 B2 * | 4/2007 | Ahn ............................. 375/231 |
| 2002/0012391 A1 | 1/2002 | Ahn |
| 2005/0013380 A1 * | 1/2005 | Kim et al. .................... 375/259 |
| 2008/0181292 A1 * | 7/2008 | Yang et al. ................... 375/232 |
| 2008/0260014 A1 * | 10/2008 | Yang et al. .................. 375/232 |

FOREIGN PATENT DOCUMENTS

| | | |
|---|---|---|
| CN | 1820510 | 8/2006 |
| JP | 2000228641 | 8/2000 |
| WO | WO-2005/101778 A1 | 10/2005 |
| WO | WO-2005101656 | 10/2005 |
| WO | WO-2005/112582 | 12/2005 |
| WO | WO-2006/001635 | 1/2006 |

OTHER PUBLICATIONS

Office Action, German Patent and Trademark Office, Application No. 10 2008 025 477.0, Aug. 24, 2009, 8 pages.
Notice of Reasons for Rejection for Japanese Patent Application No. 2008-137779, Mailed Mar. 29, 2011, 6 pages.
Final Notice of Reasons for Rejection for Japanese Patent Application No. 2008-137779, Mailed Aug. 2, 2011, 4 Pages.
First Office Action for Chinese Patent Application No. 200810124813.6 Mailed Sep. 7, 2011, Whole Document.

* cited by examiner

*Primary Examiner* — Dhaval Patel
(74) *Attorney, Agent, or Firm* — Ryder, Lu, Mazzeo and Konieczny, LLC; Douglas J. Ryder (57) ABSTRACT

A communication system comprises a receiver, which may generate broadcast coefficients that represent the characteristics of a channel using the channel information encoded in the segment synchronization units. The receiver may also use the channel information encoded in both the segment synchronization units and the field synchronization units to accurately determine the characteristics of a long channel.

18 Claims, 6 Drawing Sheets

FIG. 1 (environment in which the invention can be practised)

FIG. 3 (Component of Fig.1 in which the invention is practised)

$$Y(n) = \sum_{k=0}^{L} h(k) * x(n-k) + w(n) \quad \text{---} \quad 401$$

$$Y(n) = 5 * \{h(0) - h(1) - h(2) + h(3)\} + \sum_{k=4}^{L} h(k) * x(n-k) + w(n) \quad \text{---} \quad 402$$

$$C(m) = \frac{1}{N}\sum_{k=0}^{N} y(n + m + 832k) \quad \text{---} \quad 403$$

$$C(0) = 5 * \{h(0) - h(1) - h(2) + h(3)\} + \frac{1}{N}\sum_{j=0}^{N}\{\sum_{k=4}^{L} h(k) \, x(n + 832j - k) + w(n + 832j)\} \quad \text{---} \quad 404$$

$$C(0) = 5 * \{h(0) - h(1) - h(2) + h(3)\} + \frac{1}{N}\{\sum_{k=4}^{L} h(k) \sum_{j=0}^{N} x(n + 832j - k) + \sum_{j=0}^{N} w(n + 832j)\} \quad \text{---} \quad 405$$

$$C(0) = 5 * \{h(0) - h(1) - h(2) + h(3)\} \quad \text{---} \quad 406$$

$$C(m) = 5 * \{h(m) - h(m+1) - h(m+2) + h(m+3)\} \quad \text{---} \quad 407$$

$$d(m) = \{C(m+1) + C(m)\} / 5 = h(m) - 2h(m+2) + h(m+4) \quad \text{---} \quad 408$$

$$\Phi(Q) = \sum_{m=0}^{831}\{(d(m) - q(m))^2 + (d(m-2) - 2q(m))^2 + (d(m-4) - q(m))^2\} \quad \text{---} \quad 409$$

$$h(m) = \{d(m) - 2d(m-2) + d(m-4)\}/6 \quad \text{---} \quad 410$$

*FIG. 4(A)*

$$\Gamma(m) = \{(d(m) - h(m))^2 + (d(m-2) + 2h(m))^2 + (d(m-4) - h(m))^2\} \text{------ 411}$$

$$\Omega(m) = d(m)^2 + d(m-2)^2 + d(m-4)^2 \text{------ 412}$$

$$\Omega(m) < 4\Gamma(m) \text{------ 513}$$

$$Y = [y(n), y(n-1), y(n-2), \ldots]^t \text{------ 414}$$

$$H = [h(0), h(1), h(2) \ldots h(L)]^t \text{------ 415}$$

$$X = \begin{bmatrix} x(n) & x(n-1) & \ldots & x(n-L) \\ x(n-1) & x(n-2) & \ldots & x(n-L-1) \\ x(n-2) & x(n-3) & \ldots & x(n-L-2) \\ \vdots & & & \vdots \end{bmatrix} \text{------ 416}$$

$$Y = XH \text{------ 417}$$

$$H = (X^t X)^{-1} XY \text{------ 418}$$

$$H = XY \text{------ 419}$$

$$w(k) = \begin{cases} 1 & k < M - N_0 \\ 0 & \text{else} \\ 1 & k > M + N_1 \end{cases} \text{------ 420}$$

$$g(k) = w(k) h(k) + (1 - w(k)) f(k) \text{------ 421}$$

BROADCAST CHANNEL ESTIMATOR

BACKGROUND

A communication system comprises a transmitter and a receiver coupled by a broadcast channel. The broadcast channel may distort the transmitted signal due to factors such as noise, multi-path fading, and environmental changes. The extent to which the broadcast channel may distort the transmitted signal may be determined by processing the received signal at the receiver. The received signal may be used to estimate the characteristics of the channel. The estimated characteristics of the channel may be used to recover the transmitted signal at the receiving end. In a digital television (DTV) system employing Advanced Television System Committee (ATSC) standard, the channel estimation may be performed using the field synchronization (field sync) portion embedded in the ATSC signal. However, the field sync portion may not provide enough information for accurate estimate of the characteristics of the channel, especially when the broadcast channel spans over several hundred symbols.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a broadcast channel estimator. In the following description, numerous specific details such as logic implementations, resource partitioning, or sharing, or duplication implementations, types and inter-relationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
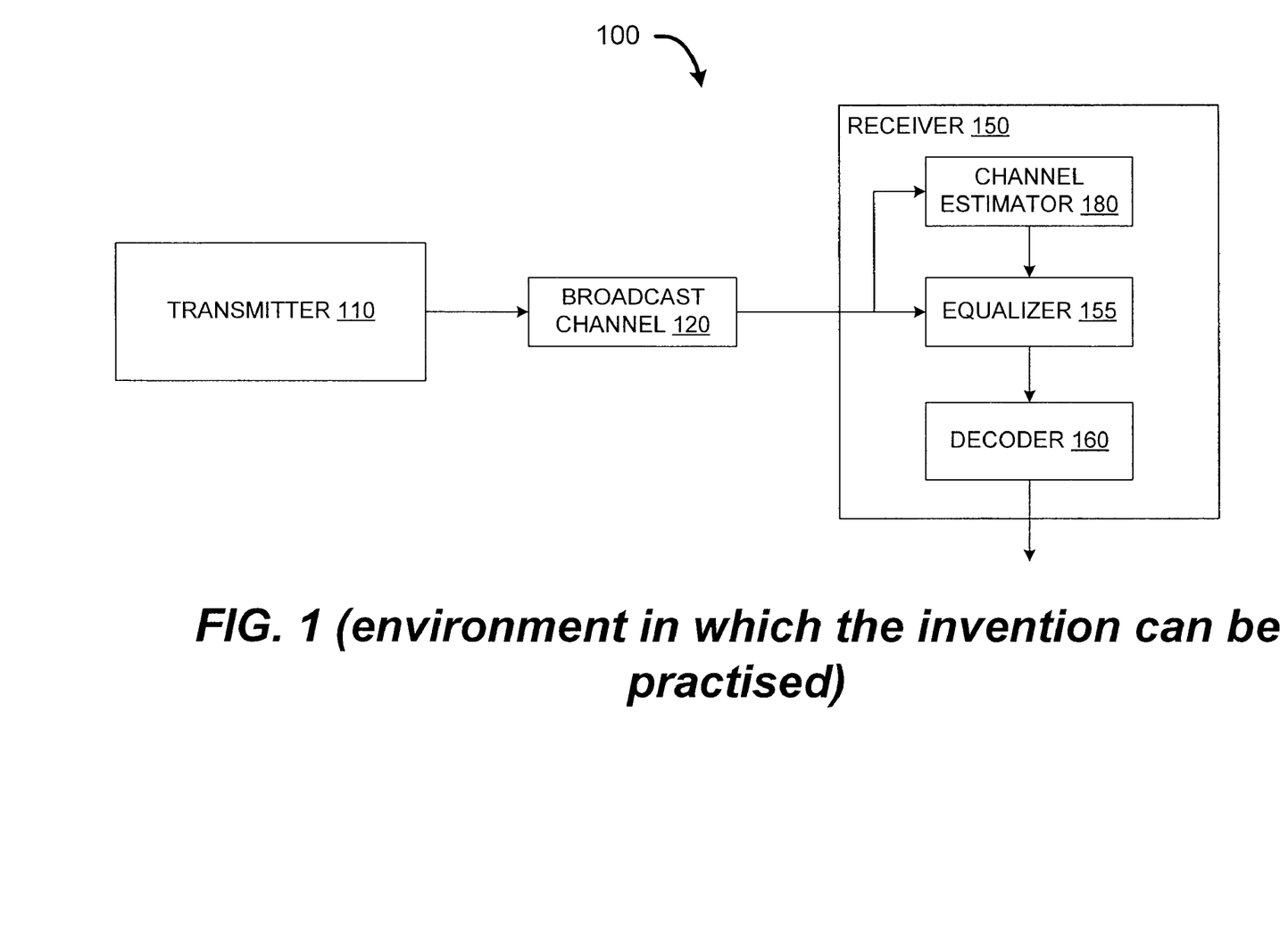
FIG. 1 illustrates an embodiment of a communication system 100.

An embodiment of a communication system 100 is illustrated in FIG. 1. The communication system 100 may comprise a transmitter 110, a broadcast channel 120, and a receiver 150.

The broadcast channel 120 may represent a wired medium such as a twisted copper pair, optical fiber, and a wireless medium such as an air medium. While transferring data frames in ATSC format, the broadcast channel 120 may comprise an air medium. In one embodiment, the characteristics of the broadcast channel 120 may be affected by environmental changes, multi-path fading, and noise factor such as Additive White Gaussian Noise (AWGN).

The transmitter 110 may process the data frames to generate signals and then transmit the signal over the broadcast channel 120. In one embodiment, the transmitter 110 may process the data frames of ATSC 8-VSB format. The transmitter 110 may include forward error correction code to facilitate error detection and correction at the receiving end, before transmitting the signal over the broadcast channel 120.

The receiver 150 may process a signal received ('received signal') over the communication channel 120 before sending the extracted data bits for further processing, for example, to a display unit of a television, or any device configured to receive data bits. In one embodiment, the receiver 150 may comprise an equalizer 155 to compensate for the distortion in the received signal and a decoder 160 to extract the data bits from the received signal.

The receiver 150 may comprise a channel estimator 180, which may generate broadcast channel coefficients in response to receiving the received signal. In one embodiment, the channel estimator 180 may generate the broadcast channel coefficients, which represent the characteristics of echoes from multiple paths. The channel estimator 180 may provide the broadcast channel coefficients to the equalizer 155 and the equalizer 155 may compensate for the distortion of the received signal based on the broadcast channel coefficients. The decoder 160 may decode the compensated signal.

Figure 2:
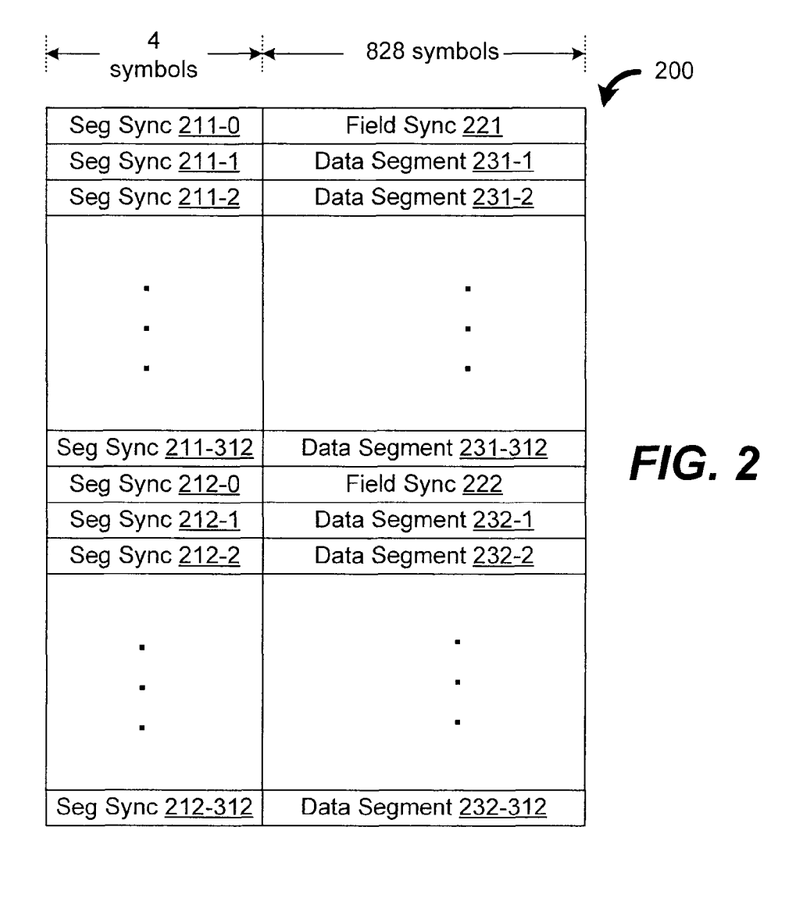
FIG. 2 illustrates an embodiment of a frame structure of an ATSC 8-VSB signal.

An embodiment of the ATSC 8-VSB data frame is depicted in FIG. 2. The data frame 200 may comprise a first data field 231 and a second data field 232. The first data field 231 may comprise a field synchronization unit (field sync) 221 and 312 data segments 231-1 to 231-312. The field sync 221 and each data segment 231-1 through 231-312 may comprise 828 symbols. The field sync 221 may indicate the start of the first data field 231 and each data segment 231 may comprise symbols representing data bits and forward error correcting codes (FEC). Each data segment 231-1 to 231-312 may also be associated with a segment synchronization units (seg sync) 211-1 to 211-312, which indicate the start of each data segment 231-1 to 211-312. Each seg sync 211-0 to 211-312 may comprise 4 symbols such as (5, −5, −5, and 5).

Similarly, the second data segment 232 may comprise a field sync 222 and 312 data fields 232-1 to 232-312. The field sync 222 and each data segment 232-1 to 232-312 may comprise 828 symbols. The field sync 222 may indicate the start of the second data field 232 and each data segment 232-1 to 232-312 may comprise symbols representing data bits and the FEC bits. Each data segment 232-1 to 232-312 may also be associated with a segment sync ('seg sync') 212-1 to 212-312, which indicate the start of each data segment 232-1 to 232-312. Each seg sync 212-1 to 212-312 may comprise 4 symbols such as (5, −5, −5, and 5). The difference between the field sync 221 and field sync 222 may lie in the sign of their $2^{nd}$ pseudo number sequence (PN63), which may facilitate the receiver 160 to build the frame structure. The receiver 160 may easily identify the field sync's 221 and 222 and seg sync's 211-0 to 211-312 and 212-0 and 212-312 from the base band signal if the channel 120 does not distort the signal.

The estimation of channel characteristics using the field sync 221 and 222 of ATSC data frame 200 may be accurate for a channel of short length. However, the field sync 221 and 222 may not provide enough information for an accurate estimation of the characteristics of the channels of longer length on an acceptable confidence level. In other words, using the field sync for estimating the characteristics of the channels of longer length may cause generation of fake values representing the far echoes. In one embodiment, the received signal may be a combination of the signals on multiple paths. In one embodiment, different paths may comprise different propagation times due to different path lengths. In one embodiment, a far echo may be a copy of a transmitted signal propagating over a path of longer distance and higher attenuation.

In one embodiment, the channel estimator 180 may use channel information involved in seg sync's 211 and 212 passing through the channel 120. In one embodiment, the channel estimator 180 may also use the channel information involved in both the field sync's 221 and 222 and the segment sync's 211 and 212 to generate the broadcast channel coefficients. In one embodiment, the broadcast channel coefficients so determined may represent coefficients having higher confidence levels. Such an approach may provide accurate estimation of the characteristics of the broadcast channel 120.

Figures 1, 3:
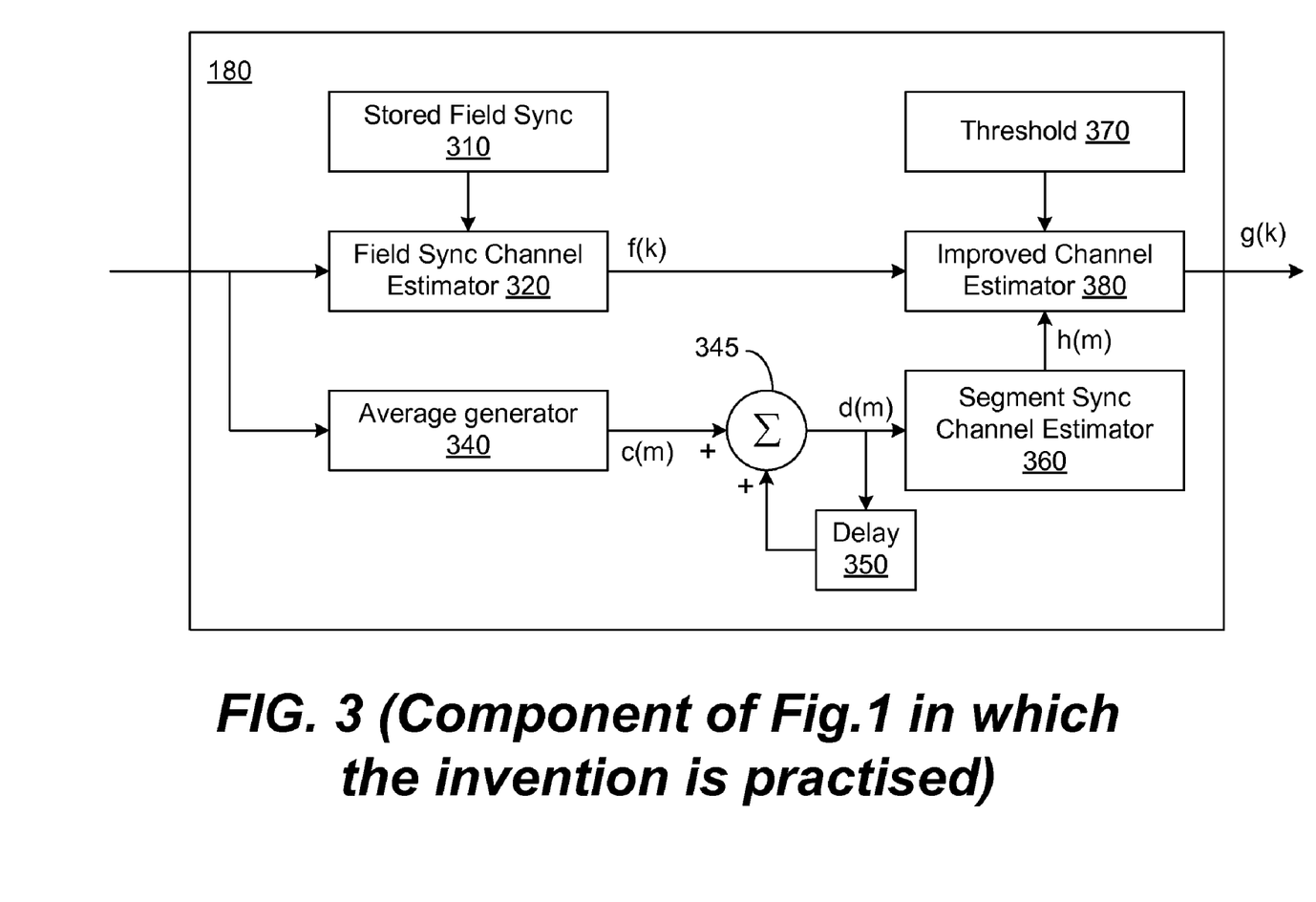
FIG. 3 illustrates an embodiment of the channel estimator 180 of FIG. 1.

An embodiment of the channel estimator 180 is illustrated in FIG. 3. The channel estimator 180 may comprise a stored field sync block 310, a field sync channel estimator 320, an average generator 340, an adder 345, a delay element 350, a segment sync channel estimator 360, a threshold block 370, and an improved channel estimator 380.

In one embodiment, the field sync channel estimator 320 and the seg sync average generator 340 may receive y(n) as the input. In one embodiment, the received signal y(n) over the channel 120 H(z) may be expressed in terms of the original VSB symbol sequence x(n), the frequency impulse response coefficients h(k) for (k=0, 1, . . . L) of the channel 120, and the AWGN w(n). The value of L represents the length of the channel 120. The expression for y(n) is shown in Equation 401 of FIG. 4(A).

Figure 4A:
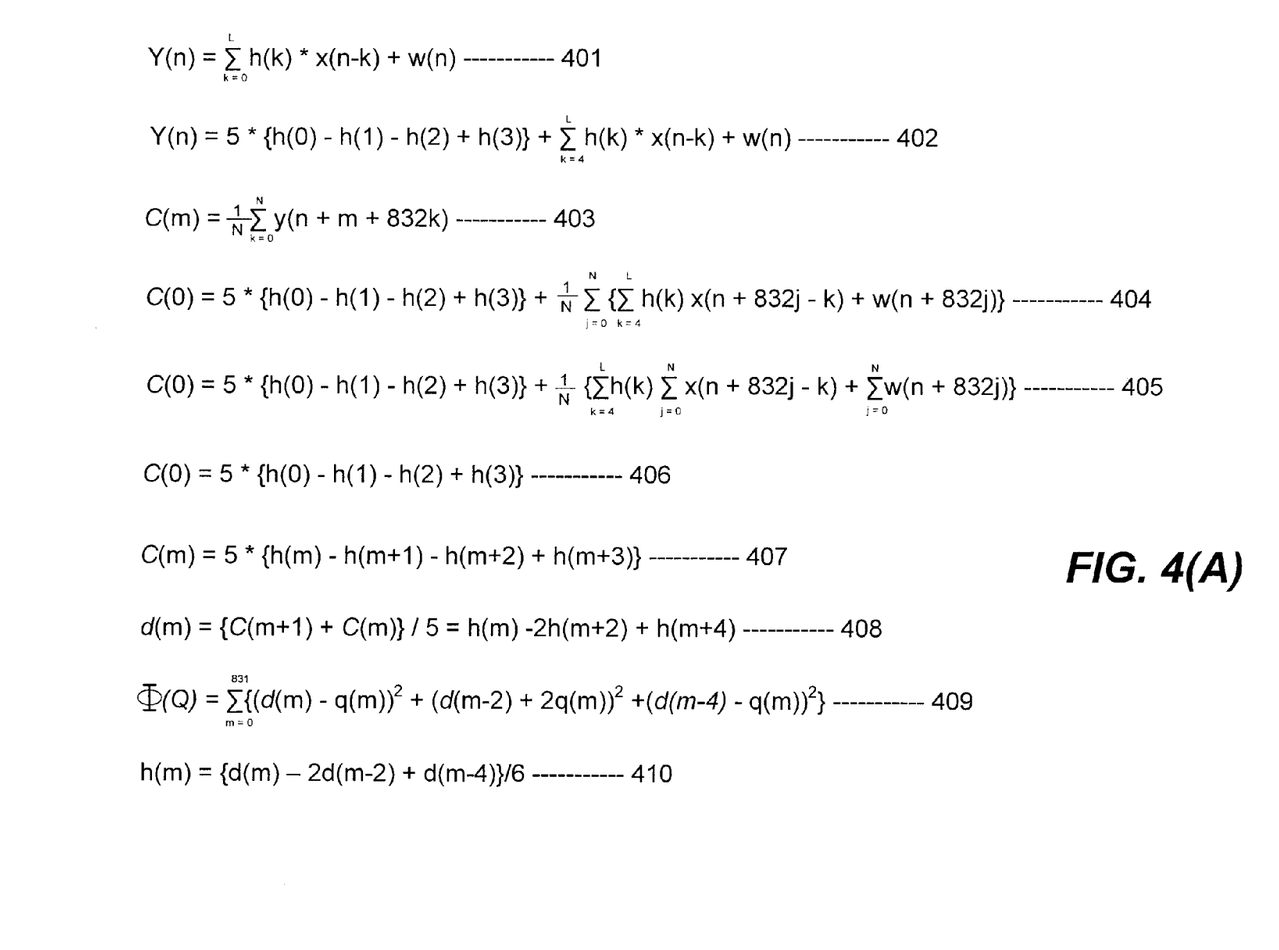
FIGS. 4A and 4B depict the mathematical expressions, which represent the operation performed by the channel estimator of FIG. 3.

In one embodiment, the symbols (5, −5, −5, and 5) of the seg sync 211 and 212 may repeat after each data segment 231 and 232. In one embodiment, the first four symbols x(n), x(n+1), x(n+2), and x(n+3) of each row may represent the four symbols of the seg sync 211 or 212. Thus, y(n) may be written as shown in Equation 402.

In one embodiment, the seg sync average generator 340 may determine the average c(m) in response to receiving the received signal y(n). In one embodiment, the average c(m) of the received signal y(n) may equal the average of the received signal y(n) one of every 832 symbols and is as shown in Equation 403. In one embodiment, 'm' is a modulo-832 number and may take values in the range (0, 1, 2, . . . 831).

In one embodiment, the average of the symbols c(0) while m equals zero may be as shown in Equations 404 or 405. In one embodiment, the portion comprising symbols other than the first four symbols may be separated as they represent the average of information data symbols. Also, it may be assumed that the terms x(n+832j−k) and w(n+832j) representing symbols and additive noise are random with zero mean. Thus, the average c(0) of the symbols of the seg sync 211 and 212 is as shown in Equation 406 if N is large. For a positive integer m, which ranges between 0 and 831, the average c(m) may be written as shown in Equation 407.

In one embodiment, the adder 345 may generate a value d(m) in response to receiving the average c(m). In one embodiment, the value d(m) may be defined in terms of c(m) and is as shown in Equation 408. In one embodiment, the segment sync channel estimator 360 may use the value of d(m) to compute the impulse response coefficients h(k) for k=(0, 1, 2, . . . 831). The cost function φ(Q) associated with d(m) is shown in Equation 409, wherein Q={q(0), q(1), . . . q(831)}. The cost function φ(Q) may reach a minimum if q(m)=h(m). The solution of h(m) that minimizes the cost function φ(Q) of Equation 409 is shown in Equation 410.

Figure 4B:
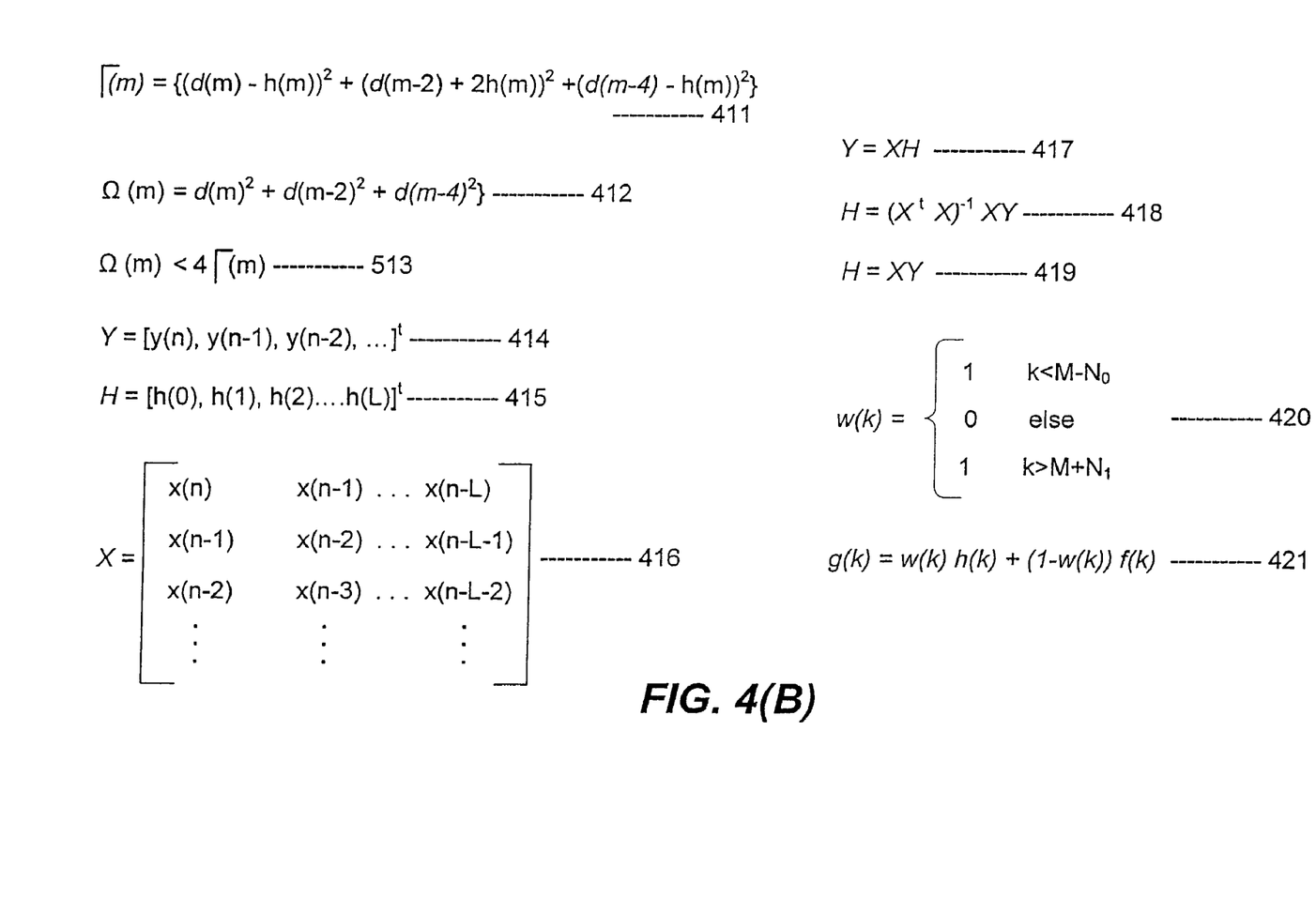

From Equation 410, the coefficients of the estimated value h(m) may be viewed as output of a high-pass FIR filter whose impulse response coefficients are [1, −2, 1] with d(m) as its input. In one embodiment, the channel estimate h(m), which is determined based on d(m) may be sensitive to noise while the real broadcast channel impulse response coefficients relate to low frequency behavior. Therefore, the channel estimate h(m) may be suitable for echoes that may be located far from the main path signal due to the high-pass filter characteristics of h(m). To avoid unreasonable values of the channel estimate h(m), some constraints Γ(m) and Ω(m), respectively, shown in Equations 411 and 412 may be determined. As indicated in Equation 413, if Ω(m) is less than 4Γ(m), the value of h(m) may equal zero and the confidence on the values of h(m) may be low.

In one embodiment, the field sync channel estimator 330 may determine the impulse response coefficients based on the symbols of the field sync 221 and 222. In one embodiment, the 828 symbols of the field sync 221 and 222 may comprise binary pseudo number sequence of period 511 followed by three binary PN sequences of period 63 each and other 128 binary symbols. In one embodiment, the stored field sync 410 may store the binary PN sequences. In one embodiment, the field sync channel estimator 330 may determine the impulse response coefficients f(k) either by least square (LS) method or by correlation method. Equations 414, 415, and 416 depict vector expressions for Y, H, and X, wherein Y is the received signal, X is the transmitted signal, and H is the impulse response of the channel 120 computed based on the field sync 221 and 222. In one embodiment, Y equals transpose, indicated by 'sub-script t', of {y(n), y(n−1), y(n−2) . . . } and H equals transpose of {h(0), h(1), . . . h(L)}.

In one embodiment, Y may be expressed in terms of X and H, which is shown in Equation 417. From the Equation 417, H may be determined, which is shown in Equation 418. In one embodiment, the Equation 418 may indicate the impulse response coefficients determined by LS method.

In one embodiment, $(X^t X)^{-1} X$ of Equation 418 may be computed in advance as X represents the training symbols of the field sync 221 and 222. However, the square matrix $(X^t X)$ may be approximated by an identity matrix. As a result of such approximation, the impulse response coefficients H may equal XY, which is shown in Equation 419. Equation 419 may represent the impulse response coefficients computed by correlation method. However, neither the LS method nor the correlation method may provide accurate estimate of the channel characteristics with a long channel span due to limited length of the training sequence and the susceptibility to noise. The estimate of the channel characteristics using LS method may provide more accurate results compared to the correlation method but, the LS method may be computationally intensive with the increase in the length of the channel.

The estimate of the channel characteristics by LS and correlation method may become invalid as the channel length approaches 832. In one embodiment, the estimate of the channel characteristics h(m) based on the seg sync 211 and 212 and the estimate of the channel characteristics H or f(k) based on the field sync 221 and 222 may be combined to estimate the characteristics of a far echo.

In one embodiment, the improved channel estimator 380 may receive the estimates of channel characteristics h(m) and f(k) and may generate the broadcast channel coefficients g(k) based on h(m) and f(k). In one embodiment, the estimated values g(k) may be generated based on the number of symbols (=828−12=816) in the field sync 221 and the total number of symbols (=313*4=1252) of the seg sync's 211-0 to 211-312. In one embodiment, the total number of symbols used to generate the estimated values may equal 2068 (=816+1252) and such an approach may provide accurate estimation of the characteristics of a long channel.

In one embodiment, the improved channel estimator 380 may combine h(m) and f(k) based on a weight function. In one embodiment, the weight function may be determined based on the distance of two preset echoes to the main path signal. In one embodiment, the distance to the two present echoes ($N_0$ and $N_1$) may respectively equal ($N_0 < M$) and ($N_1 < 832 - M$). The weight function w(k) is shown in Equation 420. In one embodiment, the improved channel estimator 380 may generate the broadcast channel coefficients g(k) as shown in Equation 421. In one embodiment, the threshold 370 may store threshold values for each g(k) and the improved channel estimator 380 may compare g(k) with the threshold and may set g(k) to zero if g(k) is less than the threshold value and retains the value of g(k) otherwise.

Figure 5:
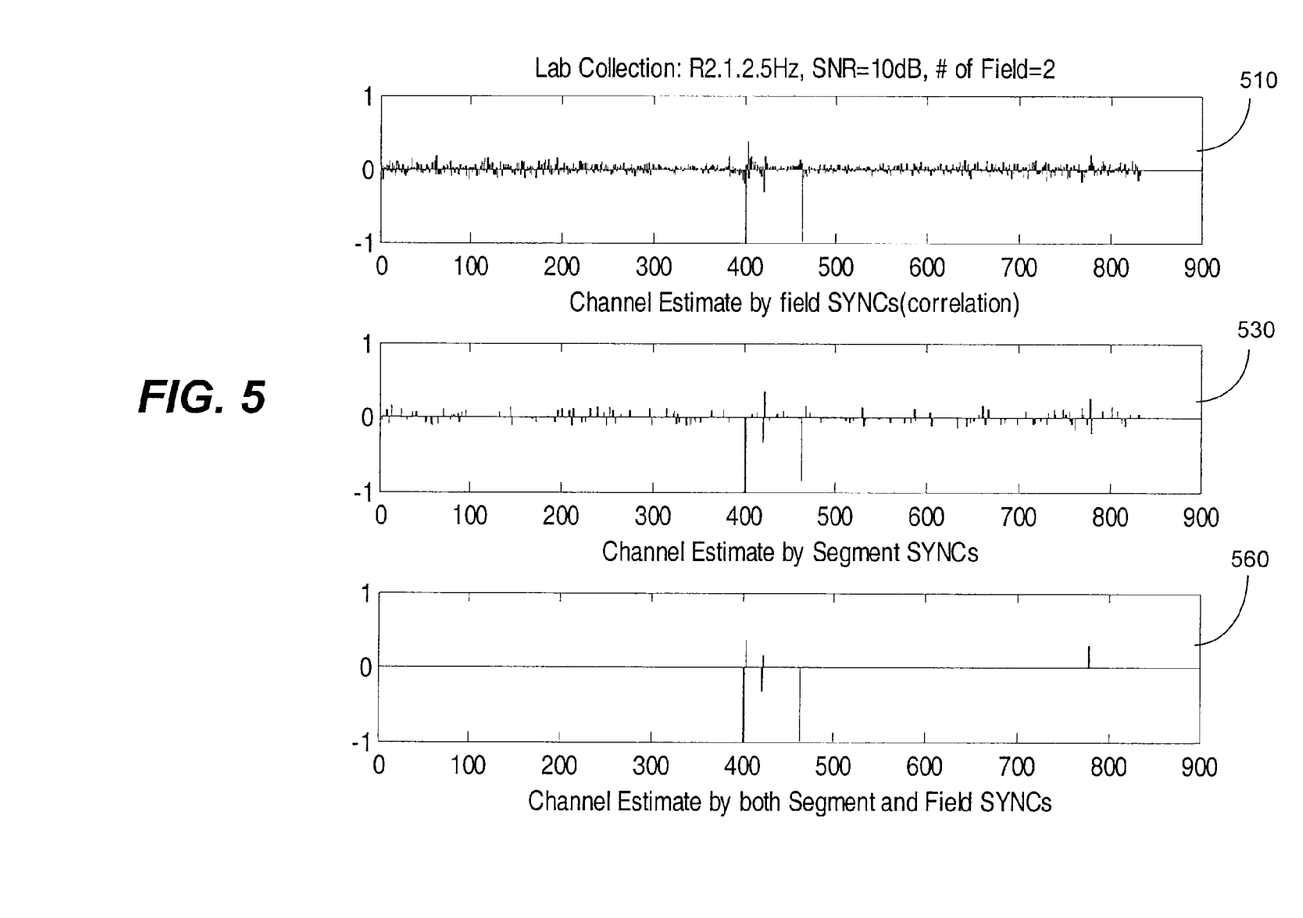
FIG. 5 depicts a plot of the output estimated channel coefficients of the channel estimator 180.

An embodiment of an estimated channel comprising a main echo, near echo, and a far echo located around 400, 465, and 775 units is depicted in FIG. 5. The estimated channel 510 is obtained by estimating the channel characteristics based on field sync 221 by correlation method. The far echo located at 775 units of the estimated channel 510 may be too small in magnitude to recognize. The estimated channel 530 depicts a main path signal at around 400 units and a roughly evident far echo at around 775 units. The estimated channel 530 is obtained by estimating the channel characteristics based on the symbols of the seg sync 211. The estimated channel 560 depicts a main path signal at around 400 units and a clearly evident far echo at around 775 units. The estimated channel 560 is obtained by estimating the channel characteristics based on the symbols of the seg sync 211 and the field sync 221. In one embodiment, the estimated channel 560 may be obtained by using the channel estimator 180 described above.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method of channel estimation in a receiver of a digital television, the method comprising:
    generating a plurality of broadcast channel coefficients for a channel having a length substantially equaling a length of a field synchronization unit, the generating the plurality of broadcast channel coefficients using a first channel impulse response coefficients and a second channel impulse response coefficients, wherein the generating including:
        determining both a first average value for first segment synchronization unit symbols in a received signal received over the channel and a second average value for second segment synchronization unit symbols in the received signal, wherein 'm' is a modulo-832 number, and
        generating a value based on a sum of the first average value and the second average value, wherein the value is used to compute the first channel impulse response coefficients,
    wherein the first channel impulse response coefficients are calculated for near echoes and far echoes related to a main path signal,
    wherein the second channel impulse response coefficients are generated using field synchronization unit symbols in the received signal, wherein the second channel impulse response coefficients are calculated for the near echoes and far echoes,
    wherein the first and second channel impulse response coefficients generated using the segment synchronization unit symbols and the field synchronization unit symbols, respectively, are combined to represent characteristics of the channel,
    compensating for distortion in the received signal, wherein the received signal is compensated using the plurality of broadcast channel coefficients, and
    decoding the received signal after the compensation.

2. The method of claim 1, wherein the plurality of broadcast channel coefficients is generated by using channel information included in segment synchronization units.

3. The method of claim 2, wherein the plurality of broadcast channel coefficients include characteristics of the far echoes.

4. The method of claim 1, wherein the plurality of broadcast channel coefficients is generated using channel information included in segment synchronization units and field synchronization units of the received signal.

5. The method of claim 1, wherein a coefficient of the plurality of broadcast channel coefficients is determined by combining one of the first channel impulse response coefficients and one of the second channel impulse response coefficients based on a weight function.

6. The method of claim 5 comprises determining the weight function using a distance of two preset echoes to the main path signal.

7. A channel estimator comprising:
    an average generator including circuitry to generate average values for a plurality of symbols of segment synchronization units for a data field in a received signal received over a channel, wherein the average generator to determine both a first average value for first segment synchronization unit symbols in the received signal and a second average value for second segment synchronization unit symbols in the received signal, wherein a value is generated based on a sum of the first average value and the second average value, wherein 'm' is a modulo-832 number, a segment synchronization channel estimator coupled to the average generator, wherein the segment synchronization channel estimator is to generate, based on the value, first channel impulse response coefficients of the channel, wherein near echoes and far echoes related to a main path signal are determined based on the first channel impulse response coefficients and second channel impulse response coefficients of the channel, a field synchronization channel estimator unit coupled to the channel, wherein the field synchronization channel estimator is to generate the second channel impulse response coefficients using field synchronization symbols in the received signal, and an improved channel estimator coupled to the segment synchronization unit and the field synchronization unit, wherein the improved channel estimator is to generate a plurality of broadcast channel coefficients using the first channel impulse response coefficients and the second channel impulse response coefficients, wherein the channel is of a length substantially equaling a length of a field synchronization unit.

8. The channel estimator of claim 7, wherein the plurality of broadcast channel coefficients represent characteristics of the channel on which the received signal is received.

9. The channel estimator of claim 8, wherein the plurality of broadcast channel coefficients is generated using channel information encoded in segment synchronization units of the received signal.

10. The channel estimator of claim 7, wherein the plurality of broadcast channel coefficients includes characteristics of the far echoes.

11. The channel estimator of claim 10, wherein the improved channel estimator is to generate the plurality of broadcast channel coefficients by combining the channel information included in segment synchronization units and field synchronization units of the received signal.

12. The channel estimator of claim 11, wherein the improved channel estimator is to determine a coefficient of the plurality of broadcast channel coefficients by combining one of the first channel impulse response coefficients and one of the second channel impulse response coefficients based on a weight function.

13. The channel estimator of claim 12, wherein the improved channel estimator is to determine the weight function using a distance of two preset echoes to the main path signal.

14. A receiver comprising:
a channel estimator to couple to a channel having a length equaling a length of a field synchronization unit, wherein the channel estimator includes circuitry to generate a plurality of broadcast channel coefficients for the channel using a first channel impulse response coefficients and a second channel impulse response coefficients, wherein the channel estimator to determine both a first average value for first segment synchronization unit symbols in a received signal received over the channel and a second average value for second segment synchronization unit symbols in the received signal, wherein 'm' is a modulo-832 number, wherein the channel estimator to generate a value based on a sum of the first average value and the second average value, wherein the value is used to compute the first channel impulse response coefficients, wherein the first channel impulse response coefficients and second channel impulse response coefficients are used to determine near echoes and far echoes related to a main path signal, wherein the second channel impulse response coefficients are generated using field synchronization unit symbols in the received signal, an equalizer coupled to the channel estimator, wherein the equalizer is to compensate for distortion in the received signal, wherein the received signal is compensated using the plurality of broadcast channel coefficients, and a decoder coupled to the channel, wherein the decoder is to decode the received signal.

15. The receiver of claim 14, wherein the channel estimator is to generate the plurality of broadcast channel coefficients using the channel information encoded in segment synchronization units of the received signal.

16. The receiver of claim 14, wherein the channel estimator is to generate the plurality of broadcast channel coefficients using the plurality of symbols of segment synchronization units and a plurality of symbols of field synchronization units of the received signal.

17. The receiver of claim 14, wherein the plurality of broadcast channel coefficients include characteristics of the far echoes.

18. The receiver of claim 15, wherein the channel estimator is to determine a value of a coefficient of the plurality of broadcast channel coefficients by combining one of the first channel impulse response coefficients and one of the second channel impulse response coefficients based on a weight function.

* * * * *